United States Patent [19]

Perry

[11] 3,859,387

[45] Jan. 7, 1975

[54] COPOLYMERIZATION PROCESS
[75] Inventor: Robert J. Perry, Houston, Tex.
[73] Assignee: Phillips Petroleum Company, Bartlesville, Okla.
[22] Filed: Jan. 14, 1974
[21] Appl. No.: 433,193

[52] U.S. Cl. ............................................. 260/878 B
[51] Int. Cl. ............................................. C08f 15/00
[58] Field of Search ................................. 260/878 B

[56] References Cited
UNITED STATES PATENTS

| | | | |
|---|---|---|---|
| 3,329,741 | 7/1967 | Schrage et al. | 260/878 B |
| 3,345,431 | 10/1967 | Harban | 260/878 B |
| 3,347,955 | 10/1967 | Renaudo | 260/878 B |
| 3,358,056 | 12/1967 | Renaudo | 260/878 B |

Primary Examiner—Joseph L. Schofer
Assistant Examiner—A. Holler

[57] ABSTRACT

In a propylene/ethylene batch copolymerization process to produce a high impact block copolymer utilizing a dual component catalyst system, comprising an organometal compound and a metal halide, the ratio of the organo-metal compound to the metal salt is varied during homopolymerization of the propylene. Catalyst activity is thus modulated permitting optimum use of reactor cooling capacity and greater yield of copolymer per batch.

11 Claims, No Drawings

COPOLYMERIZATION PROCESS

This invention relates to a process for the production of block copolymers of ethylene and propylene, containing a major amount of propylene.

It is known to prepare a propylene-ethylene block copolymer having high crystallinity, impact strength, modulus, and tensile and low brittleness temperature by polymerizing one monomer; removing any unpolymerized material; suspending the resulting polymer in a hydrocarbon solvent such as n-heptane; and polymerizing a second monomer so as to form a polymer block onto the first homopolymer block.

It is further known that by proper selection of reaction conditions it is possible to carry out both steps of the block copolymerization using a single reaction medium while still obtaining good reaction rates. In the block copolymerization of propylene and ethylene, it is possible to carry out both steps of the polymerization using liquid propylene as the sole reaction medium. In general, such a process comprises polymerizing propylene in liquid propylene in the presence of a catalyst active for such polymerization at a temperature in the range of 80° to 150°F., cooling the reaction mixture, adding ethylene and continuing the polymerization at a temperature in the range of $-50°$ to 75°F. and thereafter recovering the thus formed block copolymer. Typical of such copolymerization catalysts is the reaction product resulting from a suitable mixture of diethylaluminum chloride (DEAC) and titanium trichloride ($TiCl_3$).

Both homopolymerization and copolymerization are exothermic reactions. Substantial cooling means must be employed in order to moderate reaction rates thereby preserving desired polymer properties. The early stages of the homopolymerization require maximum cooling while latter stages of the homopolymerization step generally require relatively little cooling to maintain the desired temperature level. Because the full cooling capacity of the reactor system is not being utilized, the full productive capacity of the polymerization reactor unit cannot be realized.

Several approaches to this problem have been considered. One involves increasing the amount of catalyst charged to the reactor unit. This approach is not feasible due to the possibility of an uncontrolled reaction. Because the reaction is exothermic, reaction temperature can rise to a dangerous level in excess of the system cooling capability. A second approach is to provide a catalyst charge having a relatively low ratio of DEAC to $TiCl_3$. Such low ratio appears to modulate the reaction rate during the homopolymerization step but the reaction rate during the subsequent copolymerization step is found to be too rapid. Similarly a relatively high DEAC:$TiCl_3$ ratio is found to give a strong homopolymerization reaction and a weaker copolymerization reaction.

It is therefore an object of this invention to provide an improved batch process for the block copolymerization of propylene and ethylene.

Other objects and advantages of this invention will be apparent to those skilled in the art upon reading this disclosure.

In accordance with the present invention, I have discovered that in a propylene/ethylene batch polymerization process for production of a high impact block copolymer using a dual component catalyst system comprising an organometal compound and a metal halide, variation of the molar ratio of the organometal catalyst component to the metal halide catalyst component during homopolymerization of the propylene will permit modulation of the homo- and copolymerization rates thereby permitting optimum use of the reactor cooling capacity and thus greater yield of copolymer.

More specifically, in accordance with the present invention, there is provided an improved process for the copolymerization of propylene and ethylene which comprises a first step in which propylene is homopolymerized in the presence of liquid propylene utilizing a two-component, A/B, catalyst system, as hereinafter defined, followed by a second step in which the thus-formed homopolymer is copolymerized with ethylene in the presence of liquid propylene and homopolymer produced in the homopolymerization, wherein homopolymerization is commenced at a catalyst component molar ratio of A to B in the range of 1:1 to 1.3:1 and after 15 to 80 weight percent of the desired amount of propylene homopolymer is produced, sufficient additional component A is introduced to the reaction zone to increase the ratio A:B to a value in the range of 1.3:1 to 4:1.

Although the present invention is described in terms of a catalyst system comprising DEAC and $TiCl_3$, a wide variety of catalyst systems can be employed in the polymerization. Therefore, it is not intended to limit the invention to any particular catalyst system. Catalyst systems suitable for use in the present copolymerization process are those which are capable of polymerizing propylene in a mass polymerization system and under conditions such that solid polymer in particle form is produced. Catalyst systems suitable for use can be broadly defined as comprising an organometal compound and a metal halide. A particularly suitable catalyst is one which comprises (A) a compound having the formula $R_nMX_m$, wherein R is an alkyl, cycloalkyl or aryl radical or combinations of these radicals, such as alkaryl, aralkyl and alkylcycloalkyl; X is hydrogen or a halogen, including chlorine, bromine, iodine and fluorine; M is aluminum, gallium, indium or thallium; $n$ is from 1 to 3, inclusive; $m$ is from zero to 2, inclusive, and the sum of $m$ and $n$ is equal to the valence of the metal M; and (B) a halide of a metal of Group IV-A, IV-B, V-B, VI-B or VIII. The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

Examples of compounds corresponding to the formula $R_nMX_m$ which can be employed include trimethylaluminum, triethylaluminum, triisobutylaluminum, tri-n-butylaluminum, tri-n-pentylaluminum, triisooctylaluminum, tri-n-dodecylaluminum, triphenylaluminum, triethylgallium, triphenylgallium, tricyclohexylgallium, tri-n-butylindium, triethylthallium, diethylaluminum hydride, $CH_3AlCl_2$, $(CH_3)_2AlCl$, $C_2H_5AlCl_2$, $(C_2H_5)_2AlCl$, $(C_4H_9)_2AlBr$, $C_8H_{17}AlI_2$, $(C_3H_7)_2GaF$, $(C_8H_{11})_2$ GACl (cyclohexane derivative), $(C_6H_5)Ga Br_2$ (benzene derivative), $C_{20}H_{41}GaBr_2$, $(C_{14}H_{29})_2GaF$, $(C_6H_5)_2InCl$ (benzene derivative), $C_8H_{17}InF_2$, $(C_6H_{11})InBr_2$ (cyclohexane derivative), 3-methylcyclohexylaluminum dichloride, 2-cyclohexylethylgallium dichloride, di-(3-phenyl-1-methylpropyl) indium fluoride, 2-(3-isopropylcyclohexyl)ethylthallium dibromide and the like. Mixtures of these materials, such as a mixture of diethylaluminum chloride and ethylaluminum dichloride, etc., can also be employed.

The metal halide component of the catalyst system is preferably a halide of a Group IV-A or IV-B metal, i.e., titanium, zirconium, hafnium and germanium. The trichlorides, trifluorides, tribromides and triiodides, as well as the tetrachloride, tetrafluorides, tetrabromides and tetraiodides of the Group IV-A or IV-B metals, can be used in the catalyst system, either individually or as mixtures of two or more of the metal halides. It is usually preferred to employ a trichloride, such as titanium trichloride, in the polymerization. However, it is to be understood that halides of metals of the groups specified above, such as vanadium, molybdenum, tungsten, cobalt, and iron can also be employed in the catalyst system.

The preferred catalyst system employed in the polymerization comprises a dialkylaluminum chloride, such as diethylaluminum chloride, and titanium trichloride, the latter compound preferably being prepared by reduction of titanium tetrachloride in the presence of metallic aluminum. The reduction product is preferably a complex having the approximate formula $3TiCl_3 \cdot AlCl_3$. The reduction reaction is usually carried out at an elevated temperature, for example, at a temperature in the range of 360° to 600°F., preferably from 375° to 450°F.

The total amount of catalyst employed in the polymerization can vary over a rather wide range and will depend at least to a certain degree upon the particular catalyst system utilized. However, the determination of the amount of the catalyst employed in any particular polymerization is well within the skill of the art. The amount of metal halide employed is generally in the range of $1.5 \times 10^{-4}$ to $10 \times 10^{-4}$ part/part of propylene by weight.

The amount of DEAC initially added to the reaction zone is sufficient to provide a DEAC:TiCl$_3$ molar ratio in the range of 1:1 to 1.3:1 in the reaction zone. This excludes any significant amount of DEAC which is added to merely overcome poisons which might be in the system. When from 15 to 80 weight percent of the desired total amount of propylene homopolymer is produced, additional DEAC is added to increase the DEAC:TiCl$_3$ ratio to a value in the range of 1.3:1 to 4:1.

Although not essential to the conduct of the polymerization, it is often desirable to carry out the polymerization in the presence of a catalyst adjuvant, such as elemental hydrogen. When so operating, hydrogen is added in an amount sufficient to provide from 0.03 to 1.0 mol percent hydrogen, based on total monomers, in the liquid mono-1-olefin phase in the polymerization zone.

Other known adjuvants can be used in the process of this invention. When an adjuvant such as triphenyl phosphite is used, it can be present in an amount sufficient to provide from 1 to 10 mol percent adjuvant based upon the amount of metal halide.

The homopolymerization phase of the process of this invention is carried out at a temperature in the range of 80°-150°F. The copolymerization phase is carried out at a temperature in the range of −50° to 75°F. In a preferred embodiment, the homopolymerization is carried out at a temperature in the range of 120°-140°F.

Although pressures ranging from atmospheric up to 5,000 psig can be used, a pressure in the range of 100 to 1,000 psig is ordinarily preferred. In general, the pressure used in the process is sufficient to maintain the reaction mixture substantially in the liquid phase.

The lower temperature used when ethylene is polymerized in the second step of the polymerization can be obtained by external heat exchange or by autorefrigeration, i.e., by flashing propylene from the first reaction mixture. A combination of these cooling methods can be used.

The proportion of the polypropylene and polyethylene portions of the product can be varied widely. Generally, the predominantly polyethylene portion constitutes 2 to 25, preferably 5 to 18 percent by weight of the final product.

Although the ethylene can be added to reaction zone, in either liquid or gas phase, it is preferable in some instances to add it to the reactor zone in the liquid phase.

In general, the homopolymerization is begun by charging liquid propylene to a stirrer-equipped batch reactor. Also charged at this time are the catalyst components. If desired, catalyst adjuvants can be charged. These materials can be charged to the reactor in any order. Alternatively, some of the materials can be blended into the feedstock before charging the feedstock to the reactor. In a presently preferred embodiment, propylene is charged first and the metal halide last.

As the homopolymerization reaction progresses, make-up propylene is added to the reaction zone as solid homopolymer is formed. Approximately one-half pound of additional propylene (hereinafter referred to as trim propylene) is required for each pound of polymer formed in order to maintain a constant reaction volume within the reactor. Thus, as the reaction progresses, the amount of polymer formed can be determined by reference to the amount of trim propylene added to the reaction zone.

After sufficient trim propylene has been added such that about 15-80 percent of the desired total amount of propylene homopolymer is produced, additional DEAC is added to increase the DEAC:TiCl$_3$ ratio. This supplementary addition of DEAC can be made in one or more increments. In general, it will be added in amounts and at times appropriate to maintain a controllably high reaction rate throughout the homopolymerization phase to provide maximum utilization of the reactor volume and cooling capacity.

Following homopolymerization, the reactor is cooled and ethylene is added to the reaction zone. Additional trim propylene can be added as the copolymerization proceeds to maintain a constant volume.

After the desired amount of ethylene has been copolymerized with the propylene, as indicated by periodic analysis of the reaction mixture, the reaction mixture is passed to a batch contactor and to other sequential recovery steps wherein the copolymer is isolated, purified and pelleted. Such recovery steps are not part of the present invention and are well known to those skilled in the art.

The present invention has been found to increase the amount of copolymer obtainable from a given reactor with a given cooling capacity in a given cycle time. It has been observed that the process of this invention also provides improved batch-to-batch uniformity.

The following example illustrates the invention.

EXAMPLE I

An 8,000 gallon stirrer-equipped batch reactor is charged with 6,350 gallons (about 30,200 lb.) of propylene at 155°–160°F. and at about 450 psig. Hydrogen is added to the reactor in an amount sufficient to provide about 0.2 mol percent hydrogen. About 7.0 lb. of the titanium catalyst component, $TiCl_3 \cdot 1/3 AlCl_3$, is charged to the reaction zone together with sufficient DEAC to provide a DEAC:$TiCl_3 \cdot 1/3 AlCl_3$ molar ratio of about 1.3. The reaction is allowed to proceed at 125°–130°F., with an additional one-half lb. trim propylene added for each pound of homopolymer formed within the reaction zone.

When about 1,500 lb. trim propylene has been added and about 25 percent of the desired amount (about 11,600 lb.) of propylene homopolymer has been formed, additional DEAC is added, generally in one increment, to increase the catalyst molar ratio to about 1.7.

When about 5,800 lb. of trim propylene has been added, which takes about 4 hours, the reactor is cooled to about 65°F. and about 3,380 lb. of ethylene are charged into the reaction zone. The reaction is allowed to proceed at about 65°F. and additional trim propylene is added to maintain a constant volume within the reaction zone. After about 4 hours, or when the desired amount of ethylene is polymerized, the reaction mixture is dumped and the resulting copolymer is recovered and pelleted using conventional methods.

The total production of propylene-ethylene copolymer is about 14,000 pounds.

The foregoing example is typical, based upon data obtained from several hundred polymerization reactions carried out over a period of several months. In comparison, only about 11,000 pound average copolymer batches were previously obtained in the same equipment with the prior art procedure wherein no supplemental DEAC was added during the homopolymerization stage but a single DEAC:$TiCl_3$ ratio, typically about 1.5, was employed throughout both the homopolymerization and copolymerization stages. This example clearly demonstrates the improvement afforded by the process of this invention. For a given reactor size, cycle time, and cooling capacity, the process of this invention results in increased batch yield.

Other modifications and alterations of this invention will become apparent to those skilled in the art from the foregoing discussion and examples and it should be understood that this invention is not to be unduly limited thereto.

I claim:

1. In a process for the copolymerization of propylene and ethylene monomers comprising a first step in which propylene is homopolymerized in the presence of liquid propylene using a two-component catalyst formed by mixing materials comprising (A) a compound having the formula $R_nMX_m$, wherein R is selected from the group consisting of alkyl, cycloalkyl, and aryl radicals, X is hydrogen or a halide, M is selected from the group consisting of Al, Ga, In, and Tl, $n$ is a number from 1 to 3 inclusive, $m$ is a number from 0 to 2 inclusive, and the sum of m and n is equal to the valence of the metal M, and (B) a halide of a metal selected from the group consisting of metals of Group IV–A, IV–B, V–B, VI–B and VIII, and a second step in which ethylene is polymerized in the presence of said liquid propylene, and polymer produced in said first step and in the presence of said catalyst, the improvement which comprises commencing said homopolymerization using a catalyst component molar ratio of A to B in the range of 1:1 to 1.3:1, and after approximately 15 to 80 weight percent of the desired total amount of said homopolymer is produced, adding additional component A so as to increase the ratio of A to B to a value in the range of 1.3:1 to 4:1.

2. The process of claim 1 wherein the amount of said catalyst component B is in the range of $1.5 \times 10^{-4}$ to $10 \times 10^{-4}$ part/part of said propylene, by weight.

3. The process of claim 1 wherein there is additionally present in at least one of said polymerization steps a catalyst adjuvant.

4. The process of claim 3 wherein said adjuvant is selected from the group consisting of hydrogen and triphenyl phosphite.

5. The process of claim 4 wherein said adjuvant is hydrogen, said hydrogen being present in an amount ranging from 0.03 to 1.0 mol percent of said monomers.

6. The process of claim 4 wherein said adjuvant is triphenyl phosphite, said adjuvant being present in an amount ranging from 1 to 10 mol percent of said catalyst component B.

7. The process of claim 1 wherein said catalyst component A is diethylaluminum chloride and said component B is a complex having the approximate formula $3TiCl_3 \cdot AlCl_3$, said component B having been prepared by the reduction of titanium tetrachloride in the presence of aluminum.

8. The process of claim 1 wherein additional propylene is added to the reaction zone during said polymerization process in amount sufficient to maintain a constant reaction mixture volume in said reaction zone.

9. The process of claim 1 wherein said homopolymerization is carried out at a temperature in the range of 80° to 150°F.

10. The process of claim 1 wherein said copolymerization is carried out at a temperature in the range of −50° to 75°F.

11. The process of claim 9 wherein said homopolymerization is carried out at a temperature in the range of 120° to 140°F.

* * * * *